United States Patent [19]
Guenther et al.

[11] Patent Number: 4,591,116
[45] Date of Patent: May 27, 1986

[54] ATTITUDE CONTROL FOR SATELLITES

[75] Inventors: Hans-Jürgen Guenther; Joachim Nauck, both of Bremen; Udo Renner, Leiden; Wigbert Fehse, Lisse, all of Fed. Rep. of Germany

[73] Assignee: ERNO Raumfahrttechnik GmbH, Bremen, Fed. Rep. of Germany

[21] Appl. No.: 634,418

[22] Filed: Jul. 25, 1984

[30] Foreign Application Priority Data

Aug. 19, 1983 [DE] Fed. Rep. of Germany ....... 3329955

[51] Int. Cl.⁴ .............................................. B64G 1/24
[52] U.S. Cl. .................................... 244/168; 244/173
[58] Field of Search ............ 244/168, 164, 173, 158 R

[56] References Cited

U.S. PATENT DOCUMENTS 3,863,870  2/1975  Andrews et al. ................... 244/173
4,426,052  1/1984  Huber et al. ......................... 244/168

FOREIGN PATENT DOCUMENTS 2530046  1/1984  France ................................. 244/173
2531547  2/1984  France ................................. 244/168

Primary Examiner—Galen L. Barefoot
Attorney, Agent, or Firm—Ralf H. Siegemund

[57] ABSTRACT

The attitude control is provided under utilization of the solar wind in that the effective surface area of solar panels facing the sun is controlled in accordance with certain rules of asymmetry and under utilization of pulling cable so that an imbalance in received solar pressure is utilized to change the attitude of the satellite.

4 Claims, 4 Drawing Figures

FIG. 1a
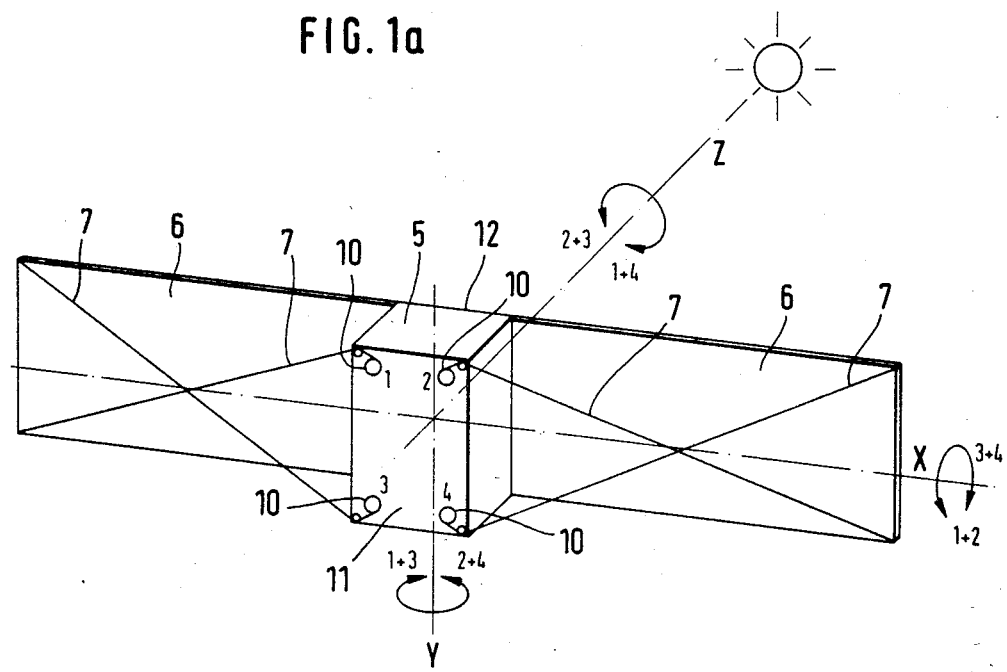
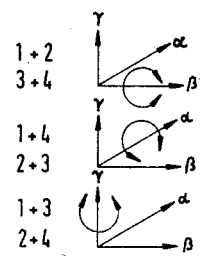
FIG. 1b
α, β ≙ ROLL AND YAW
γ ≙ PITCH

ATTITUDE CONTROL FOR SATELLITES

BACKGROUND OF THE INVENTION

The present invention relates to attitude and position control of satellites which are equipped with solar generators and/or solar sails.

It has been suggested to control the attitude of satellites under utilization of the so-called spin effect in that, for example, the satellite is associated with a reaction (inertia) wheel which, in dependence upon the attitude and position of the satellite is changed as to its rotational speed to control particularly the attitude. A typical attitude cantrol system is for example disclosed in U.S. Pat. No. 4,023,752. Satellites which are to be controlled are oriented with respect to the earth, and are in a position which could be described as geostationary. They are usually placed into the proper attitude after having attained their respective orbit. Reorientation of the satellite is carried out in a known manner through thrust producing systems.

Solar wind, or solar pressure, is available as a source of solar energy which is effective upon a satellite, and is capable of causing an undesired change in the satellite's attitude. Thus, onboard sensors are required to monitor this effect and to initiate restabilization of the attitude of the satellite. On the other hand, it has been proposed to use this so-called solar sailing effect, i.e., the solar wind, as a source of energy, by means of which a particular attitude of a satellite can be attained. Thus, for example, in combination with a spinning wheel, solar sails can be turned for purposes of restabilization. It will be appreciated that an attitude control in but two axes is possible in this manner.

If a satellite is placed into orbit, the solar generator of any kind, including a solar cell array or solar sails, are folded, rolled up, or in any manner compactly stored during the launching procedure, and these devices are deployed after the satellite has attained its orbit.

DESCRIPTION OF THE INVENTION

It is an object of the present invention to provide a new and improved attitude control for orbiting satellites permitting control in and on all three axes under avoidance of known thrust systems, and also under avoidance of a spinning wheel.

It is a feature of the present invention to provide attitude control of a satellite within all degrees of freedom in space by controlled deformation of a solar generator.

In accordance with the preferred embodiment of the present invention, it is suggested to link solar generators, solar sails or the like, on one side at the satellite and opposite endss thereof are tied to the satellite under utilization of ropes, cables or the like, which are crosswise tensioned, and separately as to each generator or sailing surface these panels are thus fastened to the satellite. Winches are associated with these ropes or cables inside the satellite, which permit control of the effective length of the ropes or cables. These winches are controlled by an onboard sensor system, being basically of the type previously suggested, and causing operation of these winches in dependence upon the attitude and position of the satellite.

It can thus be seen that the satellite is provided with an onboard closed feedback loop, particularly for the control of four rope or cable winches. If any, some, or all of these ropes are shortened as to effective length, the generator or sailing surface will be bent or curved, and thereby the effective surface exposed to solar radiation is reduced. As soon as the satellite is subjected to a disturbance or interference of its attitude, for example, through solar wind, the curvature of the respective surfaces is changed for purposes of attitude compensation.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1a is a somewhat schematic view of a satellite with fully deployed solar generator panels;

FIG. 1b is a more schematic representation drawn in combination with three-dimensional diagrams explaining certain angular relations;

Proceeding now to the detailed description of the drawings, FIG. 1a illustrates a pair of solar generator panels 6 which are attached to and extend from a satellite 5. These panels extend in a planar configuration, and are of rectangular configuration; they are attached to the satellite body 5 along one of the short edges. The corners of the panels, there being two of them per panel, are affixed and attached to cables or ropes 7, whose respective other ends are run onto winches 10. There are accordingly four such winches, and the respective cable ends are denoted with reference numerals 1, 2, 3 and 4. FIG. 1a illustrates the full extent of the panels, and in effect maximum effective lengths of these cables 7 as they are unwound from the winches 10.

FIG. 1a also illustrates three axes X, Y and Z, wherein the axes X runs centrally along the longitudinal direction of the two panels 6, and the axis Y extends perpendicularly thereto in or parallel to the plane of normal extension and deployment of the panels 6. The Z axis extends transverse to both the X and the Y axes; all axes intersect in the center of gravity of the satellite. As indicated in FIGS. 1a and 1b, if the winches for the cable ends 1 and 3 pull the respective cables, the satellite will be effectively turned around the Y axis. The same is true if winches for cable ends 2 and 4 are pulled, but the direction is the opposite one. The same is not true if concurrently all four winches equally operate.

Figure 2:
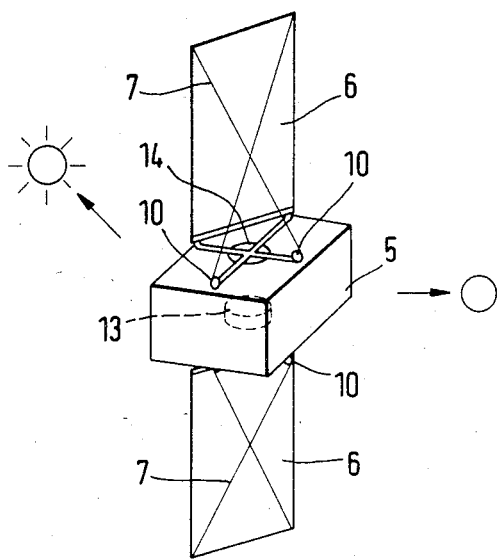
FIG. 2 illustrates a modified example for practicing the preferred embodiment of the invention in accordance with the best mode thereof.

In case the winches pull cable ends 1 and 4, the satellite will be turned about the Z axis. The same is true, but in the opposite direction, if cable ends 2 and 3 are pulled. Whenever winches pull cable ends 1 or 2, the satellite will be turned around the X axis; the same is true if the cable ends 3 and 4 are pulled, but the rotation will be in the opposite direction. It can thus be seen that through proper combination of winch and cable end operation, concurrent rotation about two axes is possible. This aspect is indicated by labeling of the various arrows; the correctness of these contentions will be justified below.

The winches are operated through adjusting elements and conventional type servo motors or actuators, which in turn will be operated in response to sensors. There will be a computer interposed which does interpret sensor signals and provides the appropriate combination of commands for any or some of these winches. It is important to realize that simply through pulling these tensioning cables in particular combinations, the satellite can in fact be turned around any of the three axes X, Y and Z.

A known attitude measuring and sensor system is, for example, oriented to point in the direction of the sun, and the satellite is controlled in accordance with that particular direction as zero or desired altitude. If any change occurs, the winches, i.e., some of them are controlled through the aforementioned feedback loops, causing the roops or cables 7 to be pulled. As a consequence of such pulling operation, the surface of the solar generator is modified, which means the effective surface area indicated in FIG. 3 as facing the sun is changed, and the resulting modified actual surface 9 causes the satellite to be rotated.

Figure 3:
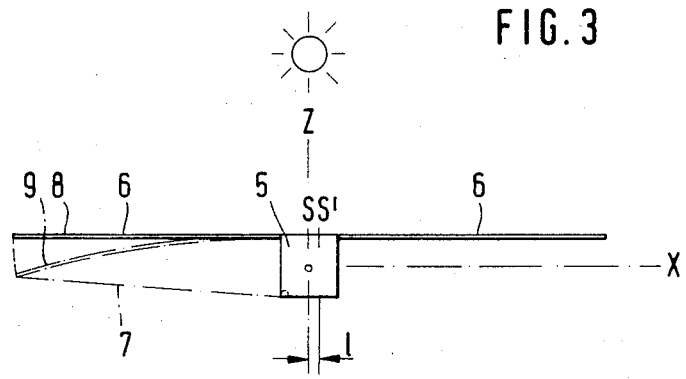
FIG. 3 is a schematic edge-on view applicable to the device shown in FIG. 1a or 2, illustrating the effectiveness of a changed curvature of a solar generator.

FIG. 3 basically illustrates that the effective surface of the solar generator panels as capturing solar wind by being exposed to the sun is reduced, but one can see also that even single rope operation may also cause a change in rotation. However, a symmetric and pairwise operation is preferred. In order to obtain as large a cable tension as possible, cables 7 are linked to the surface 11 of the satellite, as shown in FIG. 1a, while the side indicated by reference numeral 12 in FIG. 1a denotes the area which is covered with solar cells. It is of course then this side which under normal operations will face the sun.

FIG. 2 illustrates a somewhat modified example, which is particularly used for adapting existing satellite constructions to the novel concept. It is assumed therefore that a spinning wheel 13 is provided inside of this particular satellite 5'. A turning cross outside the satellite is provided for purposes of pivoting the solar panel. The turning cross is in effect the support for a deployed solar generator panel, and a pair of cables provides in addition control for the effective generator surface. It is necessary, however, in this case to mount the requisite winches onto the turning cross 14 and the feeding of the requisite control signals has to be carried out through the axle of the cross. Otherwise, however, the generator panels are tensioned through the cable, and their effective surface is modified through cable tension. The rotation of the cross 14 is an additional parameter of adjustment. Nevertheless it can readily be seen that in this particular example still only a control is possible for rotation about two axes, namely the Z and the X axes.

The operation of the invention general and of the device shown in FIGS. 1a, 1b and 3 in particular, is as follows: It is assumed that the satellite is oriented towards the sun as a whole, or a particular sensor system attains that particular orientation. The radiation pressure provided by and emanating from the sun is effective upon the entire surface area of the satellite as it faces the sun. This solar sailing effect is to be used, bearing in mind that on the other hand the solar wind can be effective to modify the attitude of the satellite in an undesired fashion. Therefore, an active control is needed. The cable control, and here particularly the control of the effective length of the cable through the winches can be interpreted as interferring with the interference provided by solar radiation such that the desired attitude is maintained using of course the on-board sensor system, which in effect provides error signals as far as the attitude of the satellite is concerned, vis-a-vis the direction towards the sun.

It may be assumed for the moment that an interference has occurred requiring a positive turning around the Y axis. In accordance with the diagram, particularly of FIG. 1b, it can be seen that this condition requires control of those winches 10 which pull on the cable ends 1 and 3. If that is the case, the solar generator is distorted and is curved in a manner shown in FIG. 3. This distortion produces an asymmetry in the effective surface offered to the sun. Therefore, the residual of the pressure force of the so-called solar pressure moves from point S to S'. The solar pressure of course is effective on the entire effective surface, and the moment is determined by the distance between the center of gravity of the satellite from the point on which the residual and composite of the solar pressure force acts. In this specific instance we are concerned with a moment occurring around the Y axis, and of relevance is the displacement of this point (S) of attack of the pressure force along the axis to point S'. As a consequence, a moment is produced about the Y axis, which is equal to the total pressure multiplied by the total effective area multiplied by the length of the displacement from S to S' along the X axis. This then produces a rotation of the vehicle about the Y axis, which of course extends transversely to the plane of the drawing of FIG. 3.

It can readily be verified that pulling on different cable ends and for different combinations of cable ends by predetermined combination of winch operations, one can obtain different directions of movement and turning. X and Z are respectively the yaw and roll axis; Y is the pitch axis of the satellite. The diagram of FIG. 1b summarizes how the variations of cable shortening produce rotation about the respective axis. It can be seen moreover that in each of these instances the overall panel configuration is distorted on account of the selective pulling operation introducing an asymmetry with respect to the particular axis about which a rotation is thereby initiated.

The invention is not limited to the embodiments described above, but all changes and modifications thereof not constituting departures from the spirit and scope of the invention are intended to be included.

We claim:

1. Attitude control of a satellite, the satellite being provided with solar panels having a surface experiencing solar pressure, there being means for monitoring the particular attitude the vehicle has, vis-a-vis the sun, the improvement comprising:
    solar panels extending basically symmetrical in opposite directions from the satellite and are normally coplanar,
    cable means operatively connected to the extreme ends of said solar panels; said satellite being provided with winches pulling or extending the cable means for distorting and changing the effective surface of the panels to thereby change the effective surface as exposed to the solar radiation in deviation from a coplanar deployment and in a manner that is asymmetrical with regard to at least one of three orthogonal coordinate axes to thereby cause the satellite to turn on account of a residual unbalance, vis-a-vis solar pressure, there being control means connected to the means for monitoring and further connected for operating the winches to obtain the pulling and extending, said control means affecting curvature of said panels individually.

2. Attitude control as in claim 1, wherein said cables are affixed to corner points of the solar panels, and are run in a crossing relation to said satellite.

3. Attitude control of satellite having a first solar panel extending in the one direction from the satellite, and a second solar panel extending in the opposite direction, there being means on the satellite for measuring the attitude of the satellite, vis-a-vis a particular point or line of reference, the combination comprising:

a plurality of individually reelable cable leading towards extreme points of the panels, and operated by individual winches to control the curvature of the panels in dependence upon the attitude measuring device.

4. Attitude control for satellite comprising a turning cross mounted on the satellite, and a solar panel mounted on the turning cross having ends connected through cable to portions of the turning cross, there being winches on the turning cross for individually pulling said cable to change the curvature of the respective panel, the turning cross being rotatable in addition on an axis.

* * * * *